A. P. CARNAGY.
Cultivators.
No. 152,073. Patented June 16, 1874.
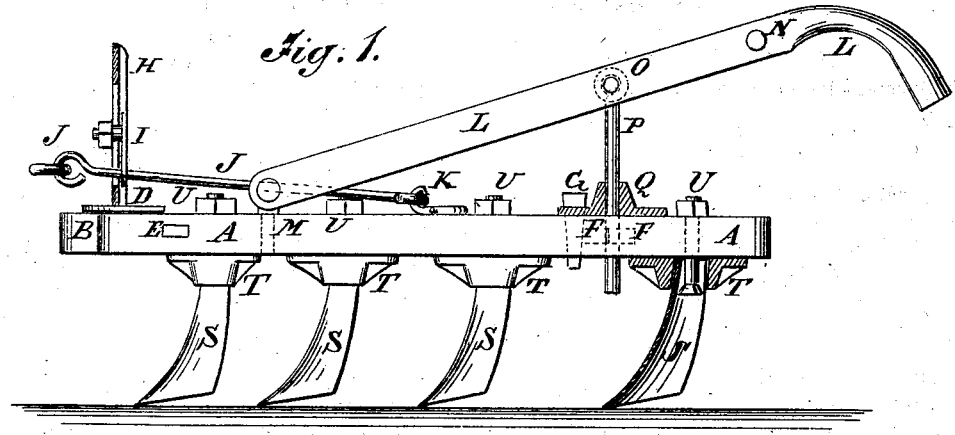
Fig. 1.
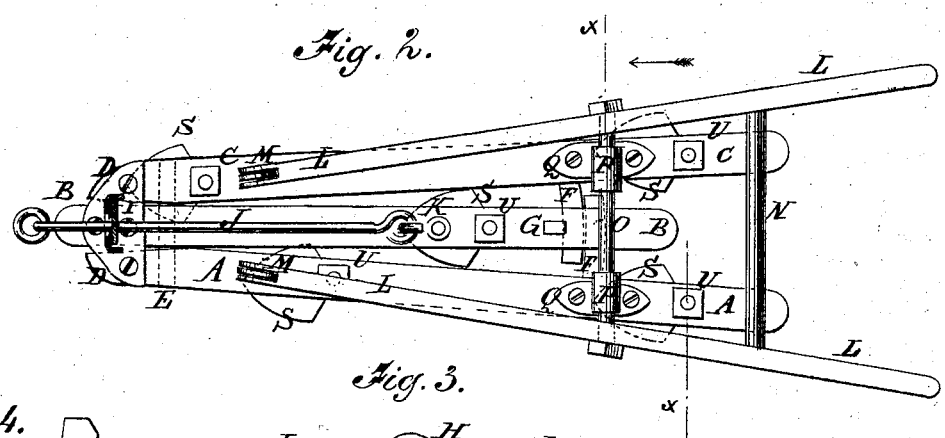
Fig. 2.
Fig. 3.
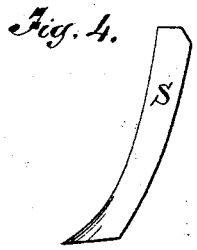
Fig. 4.
Fig. 5.
Witnesses:
Inventor,
A. P. Carnagy
Per
Attorneys.

UNITED STATES PATENT OFFICE.

ALEXANDER P. CARNAGY, OF SUMMIT BRIDGE, DELAWARE.

IMPROVEMENT IN CULTIVATORS.

Specification forming part of Letters Patent No. 152,073, dated June 16, 1874; application filed February 14, 1874.

*To all whom it may concern:*

Be it known that I, ALEXANDER P. CARNAGY, of Summit Bridge, in the county of New Castle and State of Delaware, have invented a new and useful Improvement in Cultivators, of which the following is a specification:

Figure 1 is a side view of my improved cultivator. Fig. 2 is a top view of the same. Fig. 3 is a cross-section of the same, taken through the line $x$ $x$, Fig. 2. Fig. 4 is a side view of a small-sized tooth, and Fig. 5 is a top view of the same.

Similar letters of reference indicate corresponding parts.

The invention will first be fully described, and then pointed out in the claim.

A B C are three beams, to the forward end of the central one, B, of which is secured a plate, D, to the end parts of which are pivoted the forward ends of the side beams A C. The forward ends of the beams A B C are also connected by a key, E, which passes through horizontal mortises in the said beams. To the rear part of the side beams A C are attached curved arms F, which pass through a horizontal mortise in the rear part of the center beam E, and are adjustably secured in place by a vertical key, G, driven through a vertical mortise in the central beam B, as shown in Figs. 1 and 2.

By this construction the rear part of the frame may be spread or contracted, according to the distance apart of the rows of plants to be cultivated.

To the plate D is secured the lower end of a vertical bar, H, which is slotted longitudinally to receive the guide-block I, which slides up and down in said slot, and is secured in place when adjusted by a bolt and nut. J is the draft-rod, which passes through the guide-block I, and upon its forward end is formed an eye or hook to receive a ring, link, or clevis for the attachment of the draft. Upon the rear end of the draft-rod J is formed an eye or hook to hook upon a hook, pin, or staple, K, attached to the central beam B.

By this arrangement, by raising or lowering the block I, the line of the draft may be adjusted to cause the cultivator-teeth to work deeper or shallower in the ground, as may be desired.

L are the handles, the forward ends of which are pivoted to eyebolts M, attached to the forward part of the side beams A C, and the rear parts of which are connected and held in their proper relative positions by a round, N, so that the hand-pieces may always be about the same distance apart, the spring of the forward parts of said handles being sufficient to allow the beams to be adjusted as required. The handles L are also connected by a rod, O, which passes through eyes formed in the upper ends of the rods P, which pass down through sockets Q, attached to the side beams A C, where they are adjustably secured in place by set-screws R.

This construction enables the handles to be raised and lowered, according to the height of the plowman.

The eyes of the rods P slide upon the rod O as the beams are spread or contracted. S are the cultivator-teeth, which are made of sheet metal struck up into the proper form, the upper end or shank of which being U-shaped in its cross-section. The upper ends of the teeth S are inserted in sockets T, attached in proper positions to the under side of the beams A B C, where they are secured in place by the wedge-bolts U, which are inserted in the cavity of the teeth S, pass up through the beams A B C, and are drawn into place and held by nuts screwed upon their upper ends.

By this construction the teeth will be firmly held, and at the same time may be readily detached when desired.

The teeth S may be made larger or smaller, as may be desired, according to the work to be done.

Having thus described my invention, I claim as new and desire to secure by Letters Patent—

The combination, in a cultivator, of tooth S, U-shaped in cross-section, with the independent socket T, the wedge-bolt, and the nut, as described, whereby the tooth is drawn firmly into the socket, and both secured to the beam, in the manner specified.

ALEXANDER P. CARNAGY.

Witnesses:
C. A. LUM,
WILLIAM B. FORD.